Figure 3:
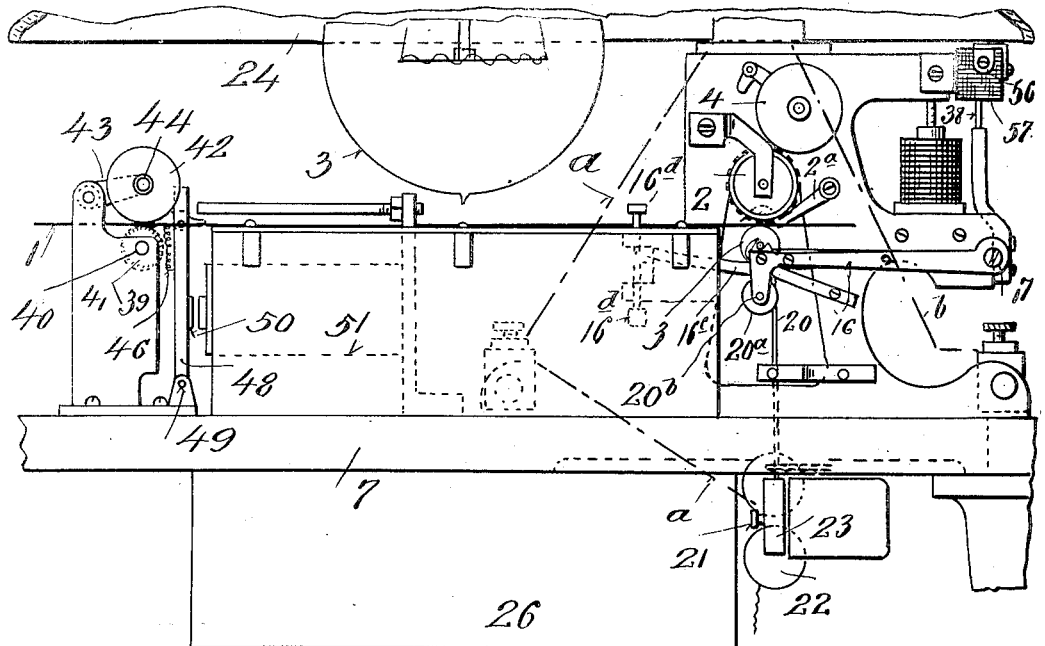

Jan. 20. 1925.     1,523,767
A. GREEN
MEANS FOR DISPLAYING QUOTATIONS AND THE LIKE
Filed July 29, 1921    4 Sheets-Sheet 1
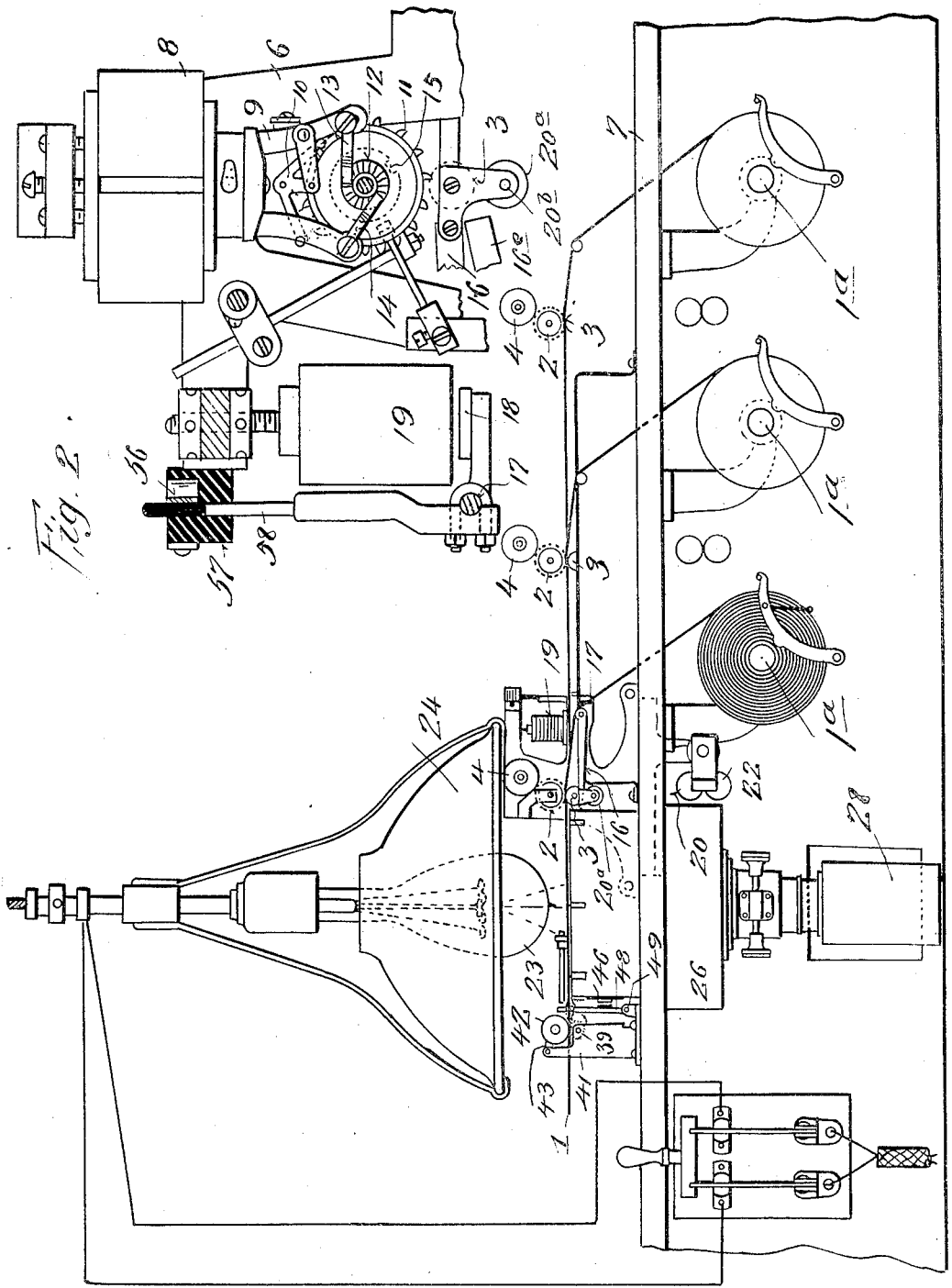
INVENTOR
Ashbel Green.
BY //// ATTORNEY Jan. 20, 1925. 1,523,767
A. GREEN
MEANS FOR DISPLAYING QUOTATIONS AND THE LIKE
Filed July 29, 1921 4 Sheets-Sheet 2

INVENTOR
Ashbel Green
BY his ATTORNEY
N. F. Bourne

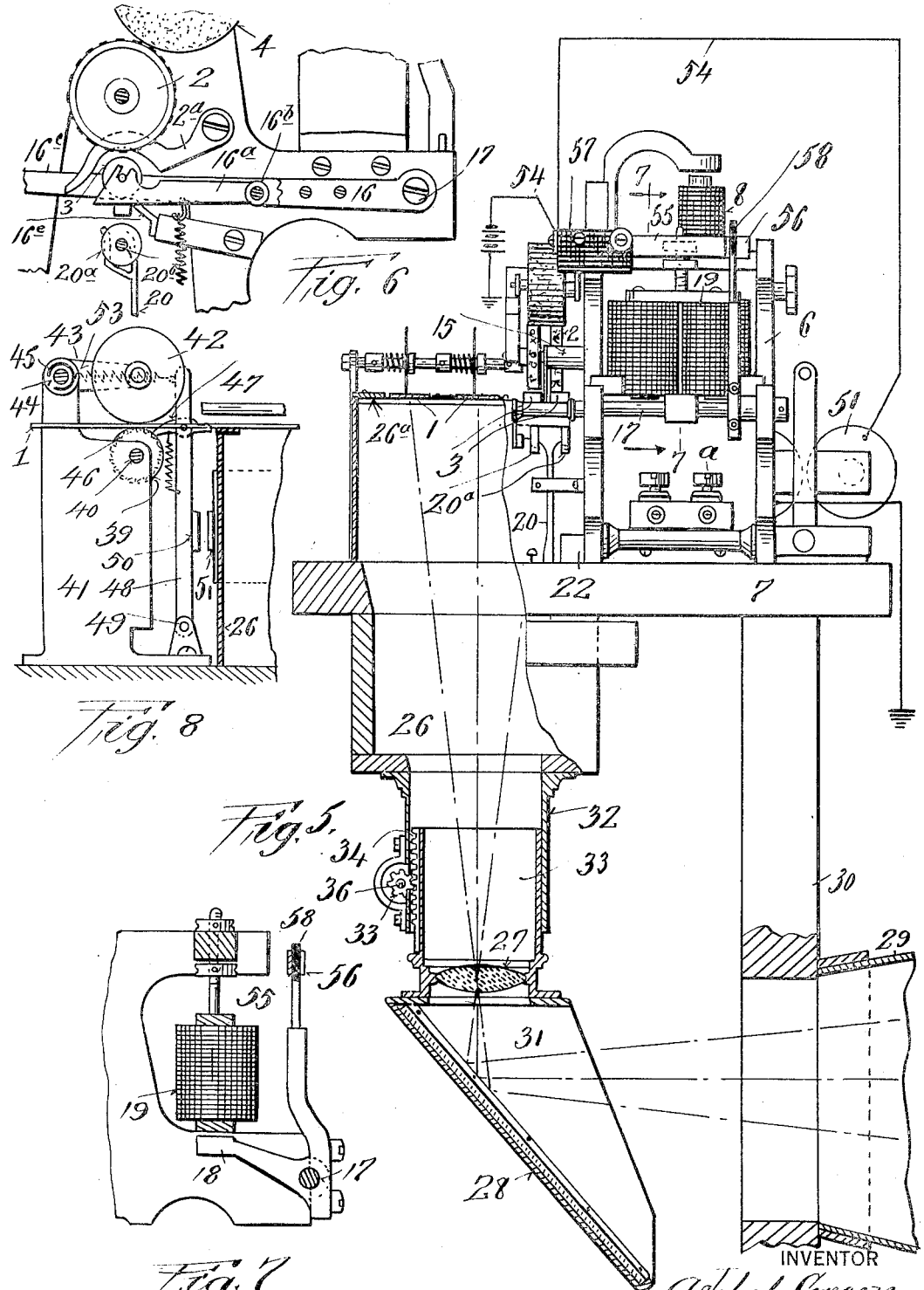

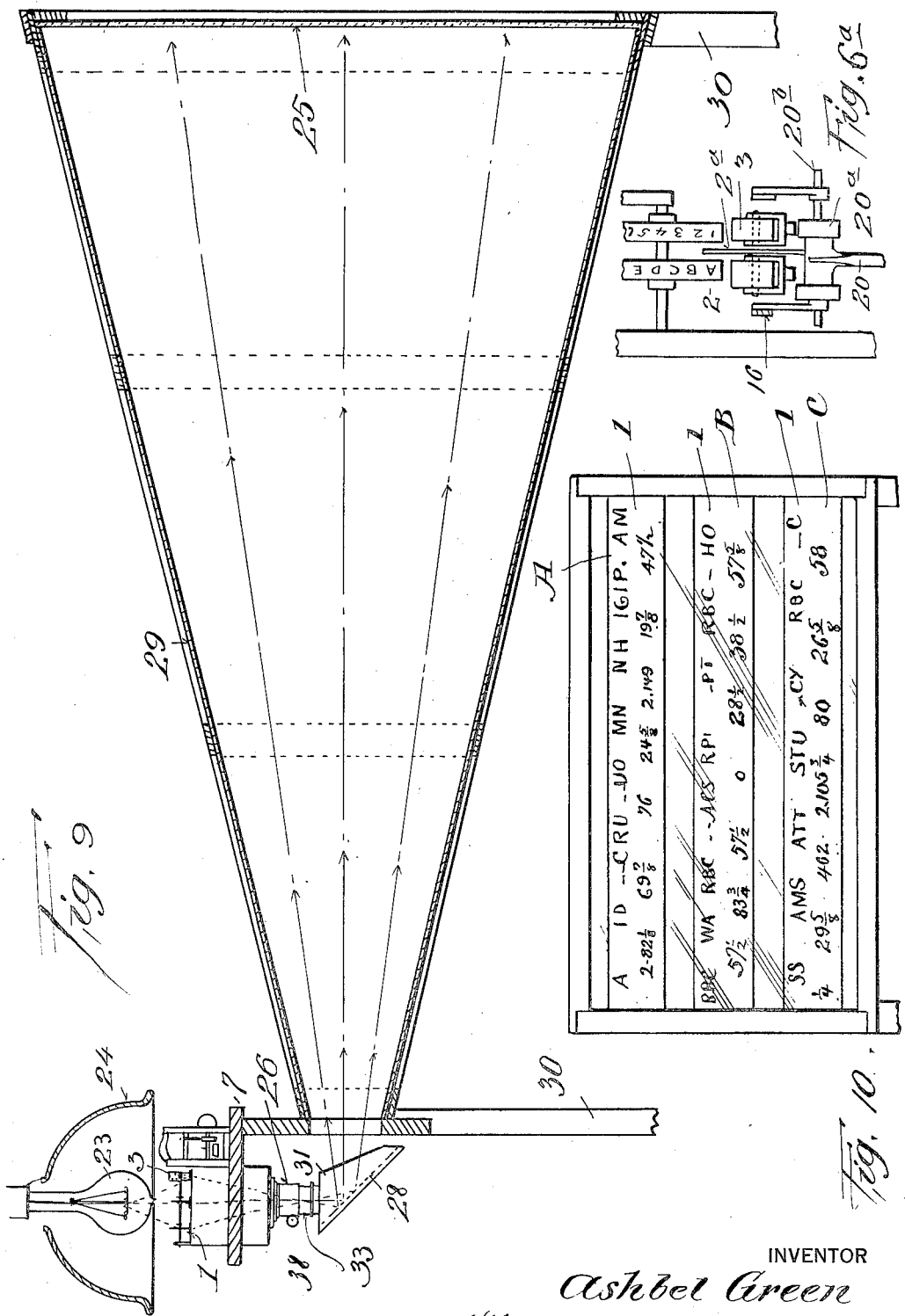

Patented Jan. 20, 1925.

1,523,767

UNITED STATES PATENT OFFICE.

ASHBEL GREEN, OF MOUNT KISCO, NEW YORK.

MEANS FOR DISPLAYING QUOTATIONS AND THE LIKE.

Application filed July 29, 1921. Serial No. 488,340.

*To all whom it may concern:*

Be it known that I, ASHBEL GREEN, a citizen of the United States, and resident of Mount Kisco, in the county of Westchester and State of New York, have invented certain new and useful Improvements in Means for Displaying Quotations and the like, of which the following is a specification.

In accordance with the present practice of distributing quotations of stocks and other commodities and transmitting information, paper tapes are passed through instruments called "tickers," containing type wheels to print upon the tape the titles or abbreviations of stocks, bonds and commodities, as well as the sales prices thereof. To ascertain the quotations or sales prices at any time, a person is obliged to examine the tape at the ticker, and thereby the number of persons who may see the quotations on a given tape at the same time are limited. Brokers on exchange boards are frequently much pressed for time, and it is inconvenient for them to leave their trading posts to examine the quotations on the ticker tape at some distant point. In some instances, as in broker's offices, quotations are copied from the ticker tapes and placed manually upon boards on the wall of the room to permit a number of persons at the same time to view the quotations, which entails added expense with chances for errors.

The object of my invention is to provide means to automatically project upon a screen or the like the quotations printed upon the tape or strip at approximately the time of printing, whereby with such screen exposed in a convenient position the brokers or others may, at a glance, from a distant point, see a range of quotations as produced on the ticker tapes and a portion of the previously printed quotations. By this means, with such screens displayed in a board room in convenient locations, the brokers may see the current quotations from their trading posts, and from other places in the room, without being obliged to inspect the ticker tape for such purposes.

In carrying out my invention I provide means to project upon a screen or glass, preferably translucent, by means of light rays, the quotations from ticker tapes on an enlarged scale, located preferably in an elevated position, the quotations appearing to travel along the screen in a manner analogous to their travel from the ticker in which the quotations are printed upon the tape. In order to display a relatively large number of quotations simultaneously in as small a compass as desirable, I preferably project, from a plurality of ticker tapes, rows of quotations, such as by projecting from three ticker tapes simultaneously the quotations at different but continuing portions of the tapes so that a continuing series of quotations will appear upon the screen in a plurality of rows or lines.

My invention also comprises novel details of improvement that will be more fully hereinafter set forth and then pointed out in the claims.

Figure 4:
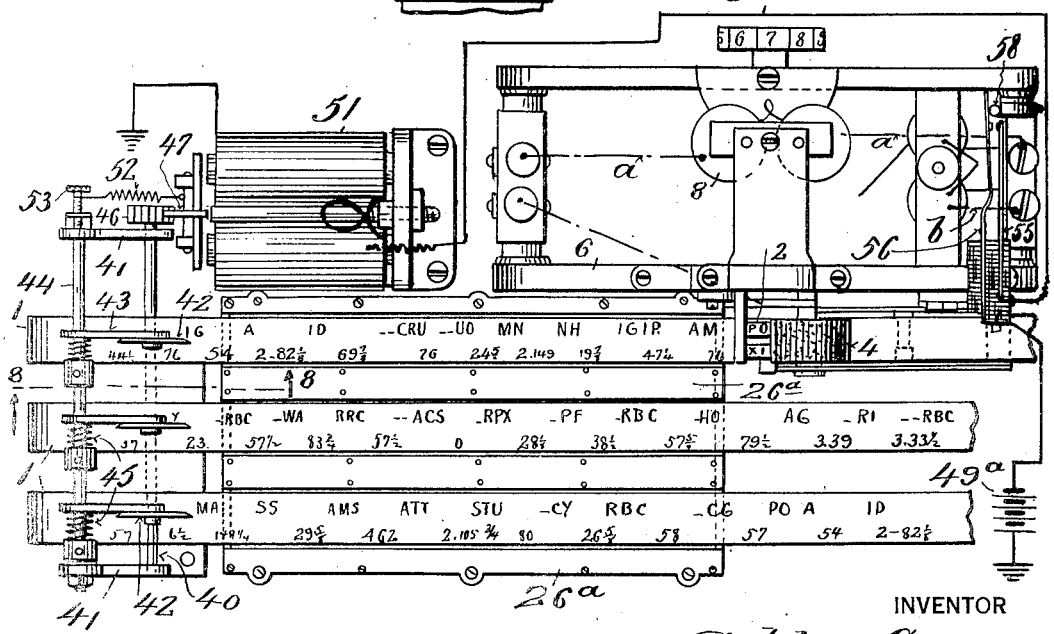

Reference is to be had to the accompanying drawings forming part hereof, wherein Figure 1 is a side elevation of my improvements; Fig. 2 is an enlarged side view of tape printing devices; Fig. 3 is an enlarged side view of part of Fig. 1; Fig. 4 is a plan view; Fig. 5 is an end view, partly in section; Fig. 6 is a detail of the tape printing devices; Fig. 6ª is a detail view of parts shown in Fig. 6; Fig. 7 is a section on line 7, 7 in Fig. 5; Fig. 8 is a section on line 8, 8 in Fig. 4; Fig. 9 is a cross section, and Fig. 10 is a side view of Fig. 9, on a reduced scale.

Similar characters of reference indicate corresponding parts in the several views.

The ticker tape or strip is indicated at 1 and for the purpose of illustration three ticker tapes are shown side by side, although any desired number of such tapes may be utilized. The titles, quotations, information, or other designations may be printed upon the ticker tape in any usual manner as the tape is fed. I have illustrated printing wheels shown having annular rows of letters and numerals in a usual way in stock tickers. Impression rolls 3 oppose the printing wheels 2, between which the ticker tape travels. An ink roller 4 engages the printing wheels 2. The printing wheels and impression rolls may be operated in any usual or desired manner, over a suitable electric circuit, it being customary with ticker service to distribute signals over the lines for the various tickers from a central station. The aforesaid wheels and rolls are supported by frame 6 shown carried by a table 7. A magnet 8 carried by said frame is adapted to actuate mechanism for rotating the printing wheel, which may be of any usual construction in the class of tickers referred to, shown comprising an oscillating lever 9, actuated by the magnet, escapement 10, escape wheel 11 secured on shaft 12 of the printing wheel, and pawls 13, 14 operating with toothed wheel 15 on shaft 12, Fig. 2, whereby when the appropriate impulses are sent on the line from the distributer at the central station the printing wheel will be rotated to bring the desired letter or numeral in printing position over the tape, whereupon the printing wheel comes to rest, such operations occurring for each letter or figure to be printed on the tape. Separate impression rolls 3 are carried by arms 16$^a$ journaled on rod 16$^b$ on a lever 16 secured upon shaft 17 (Fig. 6), which carries armature 18 of magnate 19 supported by frame 6 whereby when said armature is attracted the appropriate roll 3 will be caused to press the tape against the printing wheel. The impression rolls 3 are individually actuated by rolls 20$^a$ on shaft 20$^b$ slidably carried by lever 16. The rolls 20$^a$ are moved back and forth to present one or the other opposite the roll 3 intended to cooperate with a letter or numeral of the printing wheel, for which purpose lever 20 is forked at 20$^c$ to engage rolls 20$^a$ and lever 20 is pivoted at 21 and rocked by armature 23 of magnet 22, (which armature 23 carries lever 20), so that when the proper impulse is passed over the line through magnet 22 the lever 20 will be operated to shift the appropriate roll 20$^a$ under a roll 3 just before armature 18 is attracted by magnate 19. An extension 16$^c$ of lever 16 operates between stops 16$^d$ to control the lever. Lever 16 rests normally on stop 16$^e$. 2$^a$ indicates a guide for the tape traveling between wheels 2 and rolls 3. The circuit $a$ for type magnets 8 of the tickers, in series from the distributor at the central office, leads through the corresponding shift magnets 22, so that the latter will operate to shift the rolls 20$^a$ of the several tickers just before the impulses are sent over circuit $b$ from the distributor to operate the print rolls 3, for each impression on the tapes.

Means are provided to display the quotations or other designations from the tape upon a screen or glass, during progress of the tape, by means of a light source. I have illustrated an electric lamp 23 supported over the tape, preferably in conjunction with a reflector 24, to cause the designations on the tape to be projected or transmitted to a screen 25, which is preferably translucent, and may be of ground glass, the ticker tape or strip being suitably translucid for the purpose. The printed portion of the ticker tape is passed beneath the said light source over a tunnel or passageway 26 through which the printing is projected by the light to a lens 27 (Fig. 5), and from the lens the printing is projected on a reflector or mirror 28, whence the printing is projected to the rear side of screen 25. The screen 25 is shown at the enlarged outer end of a tunnel-like light shield 29, the inner open end of which shield is opposed to the reflector, and shown attached to table 7, the outer end of the shield being suitably supported by brace 30. The sides of the reflector or mirror are shown protected by side walls 31 against direct rays of light. The screen 25 is shown substantially perpendicular to the plane of the horozontally fed ticker tape. The tunnel or passageway 26 is shown partly telescopic comprising a tube 32 slidably receiving a tube 33 carrying lens 27 and reflector 28. Means are provided to adjust tube 33 with the lens and reflector for focusing the printing upon screen 25 in the desired position. I have shown a rack 34 upon tube 33 in mesh with a pinion 35 on a shaft 36 journaled in bearings 37 on tube 32, said shaft being provided with an operating knob or handle 38. The top of tunnel 26 is protected by cover members or opaque members 26$^a$ at the sides of the ticker tape.

While a single ticker tape may suffice to indicate on the screen a plurality of quotations at a time, yet in order to show a relatively large number of quotations on a screen of not undue length I provide a plurality of ticker tapes side by side with a plurality of printing mechanisms, one for each tape. I have shown three ticker tapes 1 (Fig. 4) and three printing wheels 2 (Fig. 1), it being understood that operating devices for each wheel 2, as before described, will be provided, in series on the circuits, a reel 1$^a$ being provided for each ticker mechanism, supported by table 7. All of the ticker tapes are fed, side by side, over tunnel 26, and the ticker instruments are so spaced apart (Fig. 1) that quotations for the width of the screen 25 will appear on one row A, the quotations for a preceding corresponding length of tape will appear on another row B, and designations for still earlier quotations will appear in another row C, and so on, for as many rows of quotations as are to be shown on the screen at one time. It will be understood that the same quotation is printed at the same time upon the several tapes by the different tickers, but by the spacing apart of the tickers or printing devices the different succeeding parts of the tapes appear simultaneously between the tunnel and the light-source, with the effect on the screen for observation of quotations several times as long as the width of the screen, the lens and reflector having the effect to show the quotations in reading order in a vertical position, as against a wall, although the printed tapes travel from the printing wheels flatwise or horizontally disposed.

Any suitable means may be provided for feeding the ticker tapes, as printed, between the tunnel and the light source. I have shown tape feeding wheels 39 corresponding to each tape secured on shaft 40 journaled upon supports 41 on table 7, (Figs. 1 and 8), pressure rolls 42 opposing the wheels 39, with the tapes between. The rolls 42 are shown journaled on arms 43 loose on shaft 44 carried by supports 41, springs 45 co-operative between said arms and shaft 44 serving to press rolls 42 properly against the tapes for contact with feeding wheels 39. Shaft 40 is provided with a ratchet wheel 46 adapted to be operated by a spring pressed pawl 47 shown pivoted upon an arm 48 journaled at 49. Arm 48 is provided with an armature 50 of an electromagnet 51 supported upon table 7, and a spring 52, shown connected with arm 48 and an adjusting screw 53 (Fig. 4), draws said arm and pawl 47 against the attraction of magnet 51. When said magnet is attracted the pawl 47 will be drawn back over ratchet 46 and when the magnet is de-energized the spring 52 will draw the pawl to rotate the ratchet and shaft 40 to cause the wheels 39 to feed the tapes 1 a proper space, such operations occurring after each character is printed on the tapes. Magnet 51 is shown included in a local circuit 54 having a battery 54ᵃ (Fig. 4). Contact springs 55, 56 are included in said circuit and shown supported by insulation 57, shown carried by bracket 6. The contacts 55, 56 are normally retained separated by a finger or rod 58 carried by shaft 17 of one of the tickers, and preferably insulated or having insulation 59 to engage contact 56. When said magnet 19 is energized to cause printing on a tape 1 by the attraction of armature 18 the finger 58 will be operated to permit contact 56 to engage contact 55, thereby closing the normally open circuit 54, energizing magnet 51, and causing pawl 47 to travel over ratchet 46. When magnet 19 is next de-energized the contacts 55, 56 will separate and open circuit 54, magnet 51 will be de-energized, and spring 52 will actuate pawl 47 to rotate ratchet 46, and the feed wheels 39 to feed the tapes a step. The feeding of the tapes will occur each time just after corresponding characters are printed on the several tapes.

In accordance with my invention the screen 25 may be placed in a convenient position for observation, the tapes will be passed through the printing devices to be printed in accordance with the quotations transmitted on the main lines from the distributing or transmitting station, and the quotations will appear on the screen as produced on the tapes. In accordance with the arrangement set forth the first quotation at the right hand side of the row A on the screen will be the current quotation or the one just printed on the corresponding tape 1 and the other quotations appearing on the screen will be those previously printed on the tapes. As a quotation disappears at the left hand end of row A the preceding quotation from row A will appear at the right on row B, and correspondingly respecting rows B and C, with the result that a relatively large number of quotations preceding the current quotations appearing on row A will be simultaneously exhibited on the screen. Brokers and others will be enabled, by means of my invention to observe quotations from a distant point without being obliged to examine the tapes at the tickers as has been customary, thereby affording a great convenience and saving time and annoyance.

Having now described my invention, what I claim is:

1. The combination of a plurality of printing mechanisms having type wheels and printing rolls, magnets provided with armatures and means to actuate said rolls, feed rolls for strips for each of said mechanisms, a magnet having an armature, means controlled by said armature to actuate said feed rolls, and a circuit for the second named magnet controlled by one of said first named magnets.

2. The combination of a plurality of printing mechanisms having type wheels and printing rolls, magnets provided with armatures and means to actuate said rolls, feed rolls for strips for each of said mechanisms, a magnet having an armature, means controlled by said armature to actuate said feed rolls, a local circuit for said magnet having normally open contacts, and a member controlled by one of the first named magnets to make and break the circuit through said contacts to control the second named magnet.

3. The combination of a plurality of printing tickers spaced apart and having magnets, means to support tapes, means having a magnet to feed said tapes simultaneously through said tickers, a circuit for said magnet, and means operative by one of the first named magnets to control said circuit.

Signed at New York city, in the county of New York, and State of New York, this 28th day of July, A. D. 1921.

ASHBEL GREEN.